United States Patent
Chintalapati et al.

(10) Patent No.: US 12,146,015 B2
(45) Date of Patent: Nov. 19, 2024

(54) CROSSLINKED POLYMER FOR DEWAXING—PREPARATION AND IMPLEMENTATIONS THEREOF

(71) Applicant: Hindustan Petroleum Corporation Limited, Bangalore (IN)

(72) Inventors: Siva Kesava Raju Chintalapati, Bangalore (IN); Naresh Kottari, Bangalore (IN); Srinivasa Rao Ganagalla, Bangalore (IN); Valavarasu Gnanasekaran, Bangalore (IN); Ravi Balasubramaniam, Bangalore (IN)

(73) Assignee: Hindustan Petroleum Corporation Limited, Bangalore (IN)

( * ) Notice: Subject to any disclaimer, the term of this patent is extended or adjusted under 35 U.S.C. 154(b) by 45 days.

(21) Appl. No.: 17/906,848

(22) PCT Filed: Apr. 21, 2021

(86) PCT No.: PCT/IN2021/050393
§ 371 (c)(1),
(2) Date: Sep. 20, 2022

(87) PCT Pub. No.: WO2021/255747
PCT Pub. Date: Dec. 23, 2021

(65) Prior Publication Data
US 2023/0141299 A1    May 11, 2023

(30) Foreign Application Priority Data

Jun. 15, 2020  (IN) .............................. 202041025174

(51) Int. Cl.
| | | |
|---|---|---|
| *C08F 220/18* | (2006.01) | |
| *C01G 21/16* | (2006.01) | |
| *C10G 21/16* | (2006.01) | |
| *C10G 73/12* | (2006.01) | |
| *C10M 101/02* | (2006.01) | |
| *C10M 177/00* | (2006.01) | |
| *C10N 70/00* | (2006.01) | |

(52) U.S. Cl.
CPC ........ *C08F 220/1818* (2020.02); *C01G 21/16* (2013.01); *C10G 73/12* (2013.01); *C10M 101/02* (2013.01); *C10M 177/00* (2013.01); *C10G 2300/304* (2013.01); *C10G 2400/10* (2013.01); *C10M 2203/1006* (2013.01); *C10N 2070/00* (2013.01)

(58) Field of Classification Search
CPC .. C08F 2/02; C08F 2/06; C08F 212/08; C08F 220/1818; C08F 232/06; C08F 8/00; C10G 21/16; C10G 2300/304; C10G 2400/10; C10G 73/12; C10M 101/02; C10M 177/00; C10M 2203/1006; C10N 2070/00; C04B 41/009; C04B 41/5011
See application file for complete search history.

(56) References Cited

U.S. PATENT DOCUMENTS 2,158,671 A    5/1939  Carr

FOREIGN PATENT DOCUMENTS

| CN | 101679819 A | 3/2010 | |
|---|---|---|---|
| EP | 0013150 A1 | 7/1980 | |
| GB | 1145427 A | 3/1969 | |
| JP | 3920594 B2 * | 5/2007 | |
| JP | 6021825 B2 * | 11/2016 | ............ C08F 220/18 |
| WO | 02100986 A1 | 12/2002 | |

OTHER PUBLICATIONS

JP-3920594-B2 English Translation (Year: 2007).*
JP-6021825-B2 English Translation (Year: 2016).*
International Search Report and Written Opinion issued in International Patent Application No. PCT/IN2021/050393, dated Aug. 16, 2021, 10 pages.
Office Action issued in Indian Patent Application No. 202041025174, dated Dec. 21, 2021, 4 pages.

* cited by examiner

*Primary Examiner* — Ellen M McAvoy
*Assistant Examiner* — Chantel Graham
(74) *Attorney, Agent, or Firm* — Armstrong Teasdale LLP

(57) ABSTRACT

The present disclosure discloses a crosslinked polymer for dewaxing the lubricating oils, the polymer derived from (a) 70-77 weight percentage of at least one alkyl acrylate; (b) 23-28 weight percentage of at least one vinyl aromatic hydrocarbon; (c) 0.1-2.5 weight percentage of at least one crosslinker; and (d) 0.75-2.5 weight percentage of at least one initiator and wherein the polymer has a number average molecular weight in the range of 5000-15000. The present disclosure discloses a convenient process for preparing the crosslinked polymer. The present disclosure further reveals a method for dewaxing the lubricating oil.

20 Claims, No Drawings

CROSSLINKED POLYMER FOR DEWAXING—PREPARATION AND IMPLEMENTATIONS THEREOF

CROSS REFERENCE TO RELATED APPLICATION

This application is a national phase of International Patent Application No. PCT/IN2021/050393 filed Apr. 21, 2021, which claims the priority benefit of Indian application Ser. No. 202041025174 filed Jun. 15, 2020, the entireties of which are incorporated herein by reference.

FIELD OF THE INVENTION

The present disclosure in general relates to the field of lubricating oils and in particular, the present disclosure relates to a process of dewaxing the lubricating oils. More particularly, the present disclosure relates to a crosslinked polymer for dewaxing the lubricating oils.

BACKGROUND OF THE INVENTION

Dewaxing is one of the significant processes used in the preparation of lubricating oils, for removal of the wax and results in an oil of markedly improved cloud and pour points. The process is usually carried out by chilling the oil with the intention of precipitating the wax, followed by filtering of the wax from the oil. It is a widespread practice to add solvents to the oil which tend to dissolve the oil and precipitate the wax. Solvents which may be used are liquid paraffins of low boiling point, such as propane, butane, pentane, hexane, light petroleum oils, mixtures of ketones and aromatic hydrocarbons, for example, methyl ethyl ketone, benzene or toluene, and chlorinated hydrocarbons, namely dichloroethane and trichloroethane.

In the dewaxing process, dewaxing aid is also important. Dewaxing aid helps to form wax crystals, improve filtration rate, improve the dewaxed oil yield and reduce the oil content in wax. Different refineries process different types of crudes and produce different grade cuts, accordingly dewaxing aid used by a refineries needs to be customized. Dewaxing aid which works for low viscosity oils may not work for high viscosity oils. It has to be mentioned that the alkyl groups in the dewaxing aid play the most significant role in the structure of the dewaxing aid. The size of the alkyl group to be used will be governed by the type of lubricating oil which has to be dewaxed. Enormous research is going on to develop a cheaper dewaxing aid, which gives good filtration rates and a higher yield of dewaxed oil.

EP0013150A1 discloses a process for dewaxing a waxy hydrocarbon oil with a ketone dewaxing solvent and a dewaxing aid comprising polyvinylpyrrolidone. U.S. Pat. No. 2,158,671A discloses a dewaxing process which involved the separation of wax from oil by the oxidation of wax with a mixture of hydrogen peroxide and a catalyst in the presence of air.

However, the greatest challenge in developing a dewaxing aid is during the filtration process there is a tendency for wax crystals to block the filters. This markedly increases the time of filtration and the amount of oil trapped in the wax cake. Hence, it is essential to prepare a dewaxing aid which can fasten the wax crystal formation, thereby reduces the time taken for filtration and result in faster separation of wax from the oil.

SUMMARY OF THE INVENTION

In an aspect of the present disclosure, there is provided a crosslinked polymer for dewaxing the lubricating oils, the polymer derived from a) 70-77 weight percentage of at least one alkyl acrylate; (b) 23-28 weight percentage of at least one vinyl aromatic hydrocarbon; (c) 0.1-2.5 weight percentage of at least one crosslinker; and (d) 0.75-2.5 weight percentage of at least one initiator, wherein the polymer has a number average molecular weight in the range of 5000-15000.

In another aspect of the present disclosure, there is provided a process for preparing the polymer, the process comprising: (a) dissolving at least one alkyl acrylate, at least one crosslinker and at least one initiator in at least one solvent to obtain a first mixture; (b) heating the first mixture to obtain a second mixture; (c) adding at least one alkyl acrylate, at least one vinyl aromatic hydrocarbon, at least one crosslinker, at least one initiator with the second mixture to obtain a third mixture; and (d) heating the third mixture to obtain the polymer.

In one another aspect of the present disclosure, there is provided a method for dewaxing the lubricating oil, the method comprising: a) obtaining a feed and at least one solvent; b) contacting the feed, the at least one solvent and the polymer for dewaxing, to obtain a blend; c) processing the blend to obtain wax and dewaxed oil, wherein the polymer is in the weight percentage in the range of 0.08-0.12% with respect to the feed.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively, and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or steps.

The term "including" is used to mean "including but not limited to", "including" and "including but not limited to" are used interchangeably.

The term "dewaxing" refers to the process of removing wax from base oil feedstocks before further processing into lubricants. In the present disclosure, dewaxing refers to the removal of wax from an oil feed. In the present disclosure, the polymer for dewaxing is also referred to as "dewaxing aid". In particular, the crosslinked polymer of the present disclosure can also be referred to as "dewaxing aid".

The term "crosslinker" refers to a molecule that links two polymer chains by the covalent or ionic bond; In the present disclosure, the term "crosslinker" refers to the group consisting of cyclopentadiene, diallyl ether, divinyl benzene, divinyl ether, and combinations thereof.

The term "initiator" refers to a substance or a chemical that can start the chain reaction or polymerization reaction. In the present disclosure, the initiator is used to initiate the polymerization reaction between alkyl acrylate, vinyl aromatic hydrocarbon and the crosslinker. The initiator of the present disclosure is not limited to benzoyl peroxide, benzoylhydroperoxide, azobisisobutyronitrile, tertbutylhydroperoxide, methylethylketone peroxide.

The term "number average molecular weight" is defined as the total weight of polymer divided by the total number of molecules. In the present disclosure, number average molecular weight is calculated for the crosslinked polymer and is in the range of 5000 to 15000.

The term "wax" refers to substance consisting primarily of long chain, saturated hydrocarbons (linear alkanes/n-paraffins) with carbon chain lengths of C18 to C75+ especially n-paraffins, naphthenes, and iso-paraffins.

The term "feed" refers to the hydrocarbon feedstock which needs to be dewaxed. In the present disclosure the feed not limited to petroleum oil, lubricating oil, atmospheric residue, various cuts of vacuum distillation column, light vacuum gas oil, heavy vacuum gas oil, heavy residue oil.

The term "dewaxed oil" refers to the oil after wax removal. In the present disclosure, the crosslinked polymer acts as dewaxing aid promotes the dewaxing process of the feed to result in dewaxed oil and the wax.

The term "pour point" refers to the lowest temperature at which oil is capable of flowing under gravity. In the present disclosure, the pour point refers to the minimum temperature at which the dewaxed oil flows freely under gravity.

Unless defined otherwise, all technical and scientific terms used herein have the same meaning as commonly understood to one of ordinary skill in the art to which this disclosure belongs. Although methods and materials similar or equivalent to those described herein can be used in the practice or testing of the disclosure, the preferred methods, and materials are now described. All publications mentioned herein are incorporated herein by reference.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight percentage of about 70% to 77% should be interpreted to include not only the explicitly recited limits of about 70% and 77%, but also to include sub-ranges, such as 71 to 73%, 74 to 77%, and so forth, as well as individual amounts, including fractional amounts, within the specified ranges, such as 71.4%, 73.8%, 75.6%, for example.

The present disclosure is not to be limited in scope by the specific embodiments described herein, which are intended for the purposes of exemplification only. Functionally equivalent products, compositions, and methods are clearly within the scope of the disclosure, as described herein.

As discussed in the background, there are various dewaxing aids that were developed for the dewaxing process. But the challenges with regards to wax deposition and filtration were yet to be addressed. In favor of obtaining efficient dewaxing aid, various polymers have been entrusted. However, the drawbacks still exist and strategies were required that could markedly facilitate the dewaxing process. The dewaxing process can be facilitated by nucleation or by adsorption. In nucleation, the dewaxing aid acts as a seed which can initiate the wax crystal formation. In adsorption, the dewaxing aid adsorbs onto the surface of the growing crystal and alters its subsequent size and shape. Thus, by enhancing either of the nucleation or adsorption processes the dewaxing process can be improved. With an aim to obtain an effective aid for the dewaxing process, a polymer comprising a crosslinker has been developed in the present disclosure. The crosslinker in the polymer will increase the nucleation rate due to close proximity of wax crystal growth.

The present disclosure provides a crosslinked polymer derived from at least one alkyl acrylate, at least one vinyl aromatic hydrocarbon, at least one crosslinker, and at least one initiator. The range of the components disclosed herein results in a crosslinked polymer for dewaxing. Also, the present disclosure provides the process of preparing the crosslinked polymer to be performed in the manner disclosed herein. Succinctly, the present disclosure provides a proficient polymer derived from the components disclosed herein and a competitive process for obtaining the crosslinked polymer. The present disclosure further provides a method for dewaxing using the crosslinked polymer of the present disclosure.

In an embodiment of the present disclosure, there is provided a crosslinked polymer for dewaxing the lubricating oils, the polymer derived from (a) 70-77 weight percentage of at least one alkyl acrylate; (b) 23-28 weight percentage of at least one vinyl aromatic hydrocarbon; (c) 0.1-2.5 weight percentage of at least one crosslinker; and (d) 0.75-2.5 weight percentage of at least one initiator, wherein the polymer has a number average molecular weight in the range of 5000-15000.

In an embodiment of the present disclosure, there is provided a crosslinked polymer for dewaxing the lubricating oils, the polymer derived from (a) 71-75 weight percentage of at least one alkyl acrylate; (b) 24-26 weight percentage of at least one vinyl aromatic hydrocarbon; (c) 0.2-1.0 weight percentage of at least one crosslinker; and (d) 1.0-2.0 weight percentage of at least one initiator, wherein the polymer has a number average molecular weight in the range of 7000-15000. In another embodiment of the present disclosure, there is provided a crosslinked polymer for dewaxing the lubricating oils, the polymer derived from (a) 72-74 weight percentage of at least one alkyl acrylate; (b) 24-25 weight percentage of at least one vinyl aromatic hydrocarbon; (c) 0.3-0.9 weight percentage of at least one crosslinker; and (d) 1.5-2.0 weight percentage of at least one initiator, wherein the polymer has a number average molecular weight in the range of 10000-15000. In yet another embodiment of the present disclosure, there is provided a crosslinked polymer for dewaxing the lubricating oils, the polymer derived from (a) 73.17 weight percentage of at least one alkyl acrylate; (b) 24.39 weight percentage of at least one vinyl aromatic hydrocarbon; (c) 0.49 weight percentage of at least one crosslinker; and (d) 1.95 weight percentage of at least one initiator, wherein the polymer has a number average molecular weight in the range of 13500-14500.

In an embodiment of the present disclosure, there is provided a crosslinked polymer for dewaxing the lubricating oils, wherein the at least one alkyl acrylate is selected from the group consisting of octadecyl acrylate, decyl acrylate, dodecyl acrylate, ethylhexyl acrylate, behenyl acrylate, eicosyl acrylate, and combinations thereof the at least one vinyl aromatic hydrocarbon is selected from the group consisting of styrene, vinyl naphthalene, vinyl anthracene, allyl benzene, methyl styrene, and combinations thereof; the at least one crosslinker is selected from the group consisting of cyclopentadiene, diallyl ether, divinyl benzene, divinyl ether, and combinations thereof and the at least one initiator is selected from the group consisting of benzoylhydroperoxide, azobisisobutyronitrile, tert butyl hydroperoxide, methyl ethyl ketone peroxide, and combinations thereof.

In an embodiment of the present disclosure, there is provided a crosslinked polymer for dewaxing the lubricating oils, wherein the at least one alkyl acrylate is selected from the group consisting of octadecyl acrylate and decyl acrylate; the at least one vinyl aromatic hydrocarbon is selected from the group consisting of styrene and vinyl naphthalene; the at least one crosslinker is selected from the group consisting of cyclopentadiene and diallyl ether; and the at least one initiator is selected from the group consisting of benzoyl hydroperoxide, azobisisobutyronitrile. In another embodiment of the present disclosure, there is provided a crosslinked polymer for dewaxing the lubricating oils, wherein the at least one alkyl acrylate is octadecyl acrylate; the at least one vinyl aromatic hydrocarbon is styrene; the at least one crosslinker is selected from cyclopentadiene and diallyl ether; and the at least one initiator is benzoyl hydroperoxide.

In an embodiment of the present disclosure, there is provided a crosslinked polymer for dewaxing the lubricating oils, the polymer derived from (a) 70-77 weight percentage of at least one alkyl acrylate selected from the group consisting of octadecyl acrylate, decyl acrylate, dodecyl acrylate, ethylhexyl acrylate, behenyl acrylate, eicosyl acrylate, and combinations thereof; (b) 23-28 weight percentage of at least one vinyl aromatic hydrocarbon selected from the group consisting of styrene, vinyl naphthalene, vinyl anthracene, allyl benzene, methyl styrene, and combinations thereof; (c) 0.1-2.5 weight percentage of at least one crosslinker selected from the group consisting of cyclopentadiene, diallyl ether, divinyl benzene, divinyl ether, and combinations thereof; and (d) 0.75-2.5 weight percentage of at least one initiator selected from the group consisting of benzoyl hydroperoxide, azobisisobutyronitrile, tert butyl hydroperoxide, methyl ethyl ketone peroxide, and combinations thereof, wherein the polymer has a number average molecular weight in the range of 5000-15000.

In an embodiment of the present disclosure, there is provided a process for preparing the polymer derived from (a) 70-77 weight percentage of at least one alkyl acrylate; (b) 23-28 weight percentage of at least one vinyl aromatic hydrocarbon; (c) 0.1-2.5 weight percentage of at least one crosslinker; and (d) 0.75-2.5 weight percentage of at least one initiator, wherein the polymer has a number average molecular weight in the range of 5000-15000, the process comprising: (a) dissolving at least one alkyl acrylate, at least one crosslinker and at least one initiator in at least one solvent to obtain a first mixture; (b) heating the first mixture to obtain a second mixture; (c) adding at least one alkyl acrylate, at least one vinyl aromatic hydrocarbon, at least one crosslinker, at least one initiator with the second mixture to obtain a third mixture; and (d) heating the third mixture to obtain the polymer.

In an embodiment of the present disclosure, there is provided a process for preparing the polymer as disclosed herein, wherein the at least one solvent is selected from a group consisting of xylene, toluene, ethyl benzene, and combinations thereof.

In an embodiment of the present disclosure, there is provided a process for preparing the polymer as disclosed herein, the process comprising: (a) dissolving at least one alkyl acrylate selected from the group consisting of octadecyl acrylate, decyl acrylate, dodecyl acrylate, ethylhexyl acrylate, behenyl acrylate, eicosyl acrylate, and combinations thereof; at least one crosslinker selected from the group consisting of cyclopentadiene, diallyl ether, divinyl benzene, divinyl ether, and combinations thereof; and at least one initiator selected from the group consisting of benzoyl hydroperoxide, azobisisobutyronitrile, tert butyl hydroperoxide, methyl ethyl ketone peroxide, and combinations thereof, in at least one solvent selected from a group consisting of xylene, toluene, ethyl benzene to obtain a first mixture; (b) heating the first mixture to obtain a second mixture; (c) adding at least one alkyl acrylate selected from the group consisting of octadecyl acrylate, decyl acrylate, dodecyl acrylate, ethylhexyl acrylate, behenyl acrylate, eicosyl acrylate, and combinations thereof, at least one vinyl aromatic hydrocarbon selected from the group consisting of styrene, vinyl naphthalene, vinyl anthracene, allyl benzene, methyl styrene, and combinations thereof, at least one crosslinker selected from the group consisting of cyclopentadiene, diallyl ether, divinyl benzene, divinyl ether, and combinations thereof, at least one initiator selected from the group consisting of benzoyl hydroperoxide, azobisisobutyronitrile, tert butyl hydroperoxide, methyl ethyl ketone peroxide, and combinations thereof with the second mixture to obtain a third mixture; and (d) heating the third mixture to obtain the polymer.

In an embodiment of the present disclosure, there is provided a process for preparing the polymer as disclosed herein, wherein the at least one alkyl acrylate has a weight percentage in the range of 45-55% with respect to the first mixture; the at least one crosslinker has a weight percentage in the range of 0.1-1.0% with respect to the first mixture; and the at least one initiator has a weight percentage in the range of 0.7-1.2% with respect to the first mixture.

In an embodiment of the present disclosure, there is provided a process for preparing the polymer as disclosed herein, wherein the at least one alkyl acrylate has a weight percentage in the range of 47-52% with respect to the first mixture; the at least one crosslinker has a weight percentage in the range of 0.15-5% with respect to the first mixture; and the at least one initiator has a weight percentage in the range of 0.8-1.0% with respect to the first mixture. In another embodiment of the present disclosure, there is provided a process for preparing the polymer as disclosed herein, wherein the at least one alkyl acrylate has a weight percentage in the range of 47-52% with respect to the first mixture; the at least one crosslinker has a weight percentage in the range of 0.15-5% with respect to the first mixture; and the at least one initiator has a weight percentage in the range of 0.8-1.0% with respect to the first mixture. In yet another embodiment of the present disclosure, there is provided a process for preparing the polymer as disclosed herein, wherein the at least one alkyl acrylate has a weight percentage in the range of 48-49% with respect to the first mixture; the at least one crosslinker has a weight percentage in the range of 0.2-0.25% with respect to the first mixture; and the at least one initiator has a weight percentage in the range of 0.9-1.0% with respect to the first mixture.

In an embodiment of the present disclosure, there is provided a process for preparing the polymer, the process comprising: (a) dissolving at least one alkyl acrylate, at least one crosslinker and at least one initiator in at least one solvent to obtain a first mixture; (b) heating the first mixture to obtain a second mixture; (c) adding at least one alkyl acrylate, at least one vinyl aromatic hydrocarbon, at least one crosslinker, at least one initiator with the second mixture to obtain a third mixture; and (d) heating the third mixture to obtain the polymer, wherein the at least one alkyl acrylate has a weight percentage in the range of 45-55% with respect to the first mixture; the at least one crosslinker has a weight percentage in the range of 0.1-1.0% with respect to the first mixture; and the at least one initiator has a weight percentage in the range of 0.7-1.2% with respect to the first mixture.

In an embodiment of the present disclosure, there is provided a process for preparing the polymer as disclosed herein, wherein heating the first mixture is done at a temperature in the range of 80-120° C. for a time period in the range of 2-4 hours. In another embodiment of the present disclosure, there is provided a process for preparing the polymer as disclosed herein, wherein heating the first mixture is done at a temperature in the range of 90-110° C. for a time period in the range of 2.5-3.5 hours. In yet another embodiment of the present disclosure, there is provided a process for preparing the polymer as disclosed herein, wherein heating the first mixture is done at a temperature of 100° C. for a time period of 3.0 hours.

In an embodiment of the present disclosure, there is provided a process for preparing the polymer, the process comprising: (a) dissolving at least one alkyl acrylate, at least one crosslinker and at least one initiator in at least one solvent to obtain a first mixture; (b) heating the first mixture to obtain a second mixture; (c) adding at least one alkyl acrylate, at least one vinyl aromatic hydrocarbon, at least one crosslinker, at least one initiator with the second mixture to obtain a third mixture; and (d) heating the third mixture to obtain the polymer and wherein heating the first mixture is done at a temperature in the range of 80-120° C. for a time period in the range of 2-4 hours.

In an embodiment of the present disclosure, there is provided a process for preparing the polymer, the process comprising: (a) dissolving at least one alkyl acrylate, at least one crosslinker and at least one initiator in at least one solvent to obtain a first mixture; (b) heating the first mixture to obtain a second mixture; (c) adding at least one alkyl acrylate, at least one vinyl aromatic hydrocarbon, at least one crosslinker, at least one initiator with the second mixture to obtain a third mixture; and (d) heating the third mixture to obtain the polymer and wherein the at least one alkyl acrylate has a weight percentage in the range of 45-55% with respect to the first mixture; the at least one crosslinker has a weight percentage in the range of 0.1-1.0% with respect to the first mixture; and the at least one initiator has a weight percentage in the range of 0.7-1.2% with respect to the first mixture and wherein heating the first mixture is done at a temperature in the range of 80-120° C. for a time period in the range of 2-4 hours.

In an embodiment of the present disclosure, there is provided a process for preparing the polymer as disclosed herein, wherein the at least one alkyl acrylate has a weight percentage in the range of 15-32% with respect to the second mixture; the at least one vinyl aromatic hydrocarbon has weight percentage in the range of 23-28% with respect to the second mixture; the at least one crosslinker has weight percentage in the range of 0.1-1.5% with respect to the second mixture; and the at least one initiator has weight percentage in the range of 0.8-1.3% with respect to the second mixture.

In an embodiment of the present disclosure, there is provided a process for preparing the polymer as disclosed herein, wherein the at least one alkyl acrylate has a weight percentage in the range of 20-28% with respect to the second mixture; the at least one vinyl aromatic hydrocarbon has weight percentage in the range of 24-26% with respect to the second mixture; the at least one crosslinker has weight percentage in the range of 0.2-1.0% with respect to the second mixture; and the at least one initiator has weight percentage in the range of 0.8-1.0% with respect to the second mixture. In another embodiment of the present disclosure, there is provided a process for provided a process for preparing the polymer as disclosed herein, wherein the at least one alkyl acrylate has a weight percentage in the range of 24-25% with respect to the second mixture; the at least one vinyl aromatic hydrocarbon has weight percentage in the range of 24-25% with respect to the second mixture; the at least one crosslinker has weight percentage in the range of 0.2-0.25% with respect to the second mixture; and the at least one initiator has weight percentage in the range of 0.9-1.0% with respect to the second mixture.

In an embodiment of the present disclosure, there is provided a process for preparing the polymer, the process comprising: (a) dissolving at least one alkyl acrylate, at least one crosslinker and at least one initiator in at least one solvent to obtain a first mixture; (b) heating the first mixture to obtain a second mixture; (c) adding at least one alkyl acrylate, at least one vinyl aromatic hydrocarbon, at least one crosslinker, at least one initiator with the second mixture to obtain a third mixture; and (d) heating the third mixture to obtain the polymer and wherein the at least one alkyl acrylate has a weight percentage in the range of 15-32% with respect to the second mixture; the at least one vinyl aromatic hydrocarbon has weight percentage in the range of 23-28% with respect to the second mixture; the at least one crosslinker has weight percentage in the range of 0.1-1.5% with respect to the second mixture; and the at least one initiator has weight percentage in the range of 0.8-1.3% with respect to the second mixture.

In an embodiment of the present disclosure, there is provided a process for preparing the polymer as disclosed herein, wherein heating the third mixture is carried out at a temperature in the range of 80-120° C. for a time period in the range of 2-4 hours.

In an embodiment of the present disclosure, there is provided a process for preparing the polymer as disclosed herein, wherein heating the third mixture is carried out at a temperature in the range of 90-110° C. for a time period in the range of 2.5-3.5 hours. In an embodiment of the present disclosure, there is provided a process for provided a process for preparing the polymer as disclosed herein, wherein heating the third mixture is carried out at a temperature of 100° C. for a time period of 3 hours.

In an embodiment of the present disclosure, there is provided a process for preparing the polymer, the process comprising: (a) dissolving at least one alkyl acrylate, at least one crosslinker and at least one initiator in at least one solvent to obtain a first mixture; (b) heating the first mixture to obtain a second mixture; (c) adding at least one alkyl acrylate, at least one vinyl aromatic hydrocarbon, at least one crosslinker, at least one initiator with the second mixture to obtain a third mixture; and (d) heating the third mixture to obtain the polymer and wherein heating the third mixture is carried out at a temperature in the range of 80-120° C. for a time period in the range of 2-4 hours.

In an embodiment of the present disclosure, there is provided a process for preparing the polymer as disclosed herein, wherein heating the third mixture is followed by termination with exposure to air to obtain the polymer. In another embodiment of the present disclosure there is a provided a process for preparing the polymer as disclosed herein, wherein heating the third mixture is followed by termination in the presence of at least one terminator selected from methanol, ethanol, water, isopropanol and combinations thereof with exposure to air to obtain the polymer.

In an embodiment of the present disclosure, there is provided a process for preparing the polymer, the process comprising: (a) dissolving at least one alkyl acrylate, at least one crosslinker and at least one initiator in at least one solvent to obtain a first mixture; (b) heating the first mixture to obtain a second mixture; (c) adding at least one alkyl acrylate, at least one vinyl aromatic hydrocarbon, at least one crosslinker, at least one initiator with the second mixture to obtain a third mixture; and (d) heating the third mixture to obtain the polymer and wherein heating the third mixture is followed by termination with exposure to air to obtain the polymer.

In an embodiment of the present disclosure, there is provided a process for preparing the polymer, the process comprising: (a) dissolving at least one alkyl acrylate having weight percentage in the range of 45-55%, at least one crosslinker having a weight percentage in the range of 0.1-1.0% and at least one initiator a weight percentage in the range of 0.7-1.2% in at least one solvent selected from a group consisting of xylene, toluene, ethyl benzene, and combinations thereof to obtain a first mixture; (b) heating the first mixture at a temperature in the range of 80-120° C. for a time period in the range of 2-4 hours to obtain a second mixture; (c) adding at least one alkyl acrylate having a weight percentage in the range of 15-32%, at least one vinyl aromatic hydrocarbon having weight percentage in the range of 23-28%, at least one crosslinker having a weight percentage in the range of 0.1-1.5%, at least one initiator having weight percentage in the range of 0.8-1.3% with the second mixture to obtain a third mixture; and (d) heating the third mixture at a temperature in the range of 80-120° C. for a time period in the range of 2-4 hours followed by termination with exposure to air to obtain the polymer.

In an embodiment of the present disclosure, there is provided a process for preparing the polymer, the process comprising: (a) dissolving at least one alkyl acrylate having weight percentage in the range of 45-55%, at least one crosslinker having a weight percentage in the range of 0.1-1.0% and at least one initiator a weight percentage in the range of 0.7-1.2% in at least one solvent selected from a group consisting of xylene, toluene, ethyl benzene, and combinations thereof to obtain a first mixture; (b) heating the first mixture at a temperature in the range of 80-120° C. for a time period in the range of 2-4 hours to obtain a second mixture; (c) adding at least one alkyl acrylate having weight percentage in the range of 15-32%, at least one vinyl aromatic hydrocarbon having weight percentage in the range of 23-28%, at least one crosslinker having a weight percentage in the range of 0.1-1.5%, at least one initiator having weight percentage in the range of 0.8-1.3% with the second mixture to obtain a third mixture; and (d) heating the third mixture at a temperature in the range of 80-120° C. for a time period in the range of 2-4 hours followed by termination with exposure to air to obtain the polymer and wherein the at least one alkyl acrylate is selected from the group consisting of octadecyl acrylate, decyl acrylate, dodecyl acrylate, ethylhexyl acrylate, behenyl acrylate, eicosyl acrylate, and combinations thereof; the at least one vinyl aromatic hydrocarbon is selected from the group consisting of styrene, vinyl naphthalene, vinyl anthracene, allyl benzene, methyl styrene, and combinations thereof; the at least one crosslinker is selected from the group consisting of cyclopentadiene, diallyl ether, divinyl benzene, divinyl ether, and combinations thereof; and the at least one initiator is selected from the group consisting of benzoylhydroperoxide, azobisisobutyronitrile, tert butyl hydroperoxide, methyl ethyl ketone peroxide, and combinations thereof and wherein the polymer has a number average molecular weight in the range of 5000-15000.

In an embodiment of the present disclosure, there is provided a process for preparing the polymer, the process comprising: (a) dissolving at least one alkyl acrylate having weight percentage in the range of 48-49%, at least one crosslinker having a weight percentage in the range of 0.2-0.25% and at least one initiator a weight percentage in the range of 0.9-1.0% in at least one solvent selected from a group consisting of xylene, toluene, ethyl benzene, and combinations thereof to obtain a first mixture; (b) heating the first mixture at a temperature of 100° C. for a time period of 3.0 hours to obtain a second mixture; (c) adding at least one alkyl acrylate having a weight percentage in the range of 24-25%, at least one vinyl aromatic hydrocarbon having weight percentage in the range of 24-25%, at least one crosslinker having a weight percentage in the range of 0.2-0.25%, at least one initiator having weight percentage in the range of 0.9-1.0% with the second mixture to obtain a third mixture; and (d) heating the third mixture at a temperature of 100° C. for a time period of 3 hours followed by termination with exposure to air to obtain the polymer wherein the at least one alkyl acrylate is octadecyl acrylate; the at least one vinyl aromatic hydrocarbon is styrene; the at least one crosslinker is selected from the group consisting of cyclopentadiene, diallyl ether, and combinations thereof and the at least one initiator is selected from the group consisting of benzoylhydroperoxide, azobisisobutyronitrile, tert butyl hydroperoxide, methyl ethyl ketone peroxide, and combinations thereof.

In an embodiment of the present disclosure, there is provided a method for dewaxing the lubricating oil, the method comprising: a) obtaining a feed and at least one solvent; b) contacting the feed, the at least one solvent and the polymer for dewaxing to obtain a blend; c) processing the blend to obtain wax and dewaxed oil; wherein the polymer is in the weight percentage in the range of 0.08-0.12% with respect to the feed.

In an embodiment of the present disclosure, there is provided a method for dewaxing the lubricating oil, the method comprising: a) obtaining a feed and at least one solvent; b) contacting the feed, the at least one solvent and the polymer having a number average molecular weight in the range of 5000-15000 derived from (i) 70-77 weight percentage of at least one alkyl acrylate; (ii) 23-28 weight percentage of at least one vinyl aromatic hydrocarbon; (iii) 0.1-2.5 weight percentage of at least one crosslinker; and (iv) 0.75-2.5 weight percentage of at least one initiator, for dewaxing to obtain a blend; c) processing the blend to obtain wax and dewaxed oil; and wherein the polymer is in the weight percentage in the range of 0.08-0.12% with respect to the feed.

In an embodiment of the present disclosure, there is provided a method for dewaxing the lubricating oil as disclosed herein, wherein the feed is selected from the group consisting of petroleum oil, lubricating oil, atmospheric residue, various cuts of vacuum distillation column, light vacuum gas oil, heavy vacuum gas oil, heavy residue oil, and wherein the at least one solvent is selected from a group consisting of methyl ethyl ketone, hexane, methyl isobutyl ketone, propane, petroleum naphtha, ethylene dichloride, methylene chloride, sulphur dioxide and combinations thereof.

In an embodiment of the present disclosure, there is provided a method for dewaxing the lubricating oil, the method comprising: a) obtaining a feed selected from the group consisting of petroleum oil, lubricating oil, atmospheric residue, various cuts of vacuum distillation column, light vacuum gas oil, heavy vacuum gas oil, heavy residue oil and at least one solvent selected from a group consisting of methyl ethyl ketone, hexane, methyl isobutyl ketone, propane, petroleum naphtha, ethylene dichloride, methylene chloride, sulphur dioxide and combinations thereof; b) contacting the feed, the at least one solvent and the polymer for dewaxing to obtain a blend; c) processing the blend to obtain wax and dewaxed oil; wherein the polymer is in the weight percentage in the range of 0.08-0.12% with respect to the feed.

In an embodiment of the present disclosure, there is provided a method for dewaxing the lubricating oil as disclosed herein, wherein the at least one solvent is selected from a group consisting of methyl ethyl ketone, hexane, methyl isobutyl ketone, propane, petroleum naphtha, ethylene dichloride, methylene chloride, sulphur dioxide and combinations thereof. In another embodiment of the present disclosure, there is provided a method for dewaxing the lubricating oil as disclosed herein, wherein the at least one solvent is selected from a group consisting of methyl ethyl ketone, hexane, and combinations thereof. In yet another embodiment of the present disclosure, there is provided a method for dewaxing the lubricating oil as disclosed herein, wherein the at least one solvent is 1:1 of methyl ethyl ketone and hexane.

In an embodiment of the present disclosure, there is provided a method for dewaxing the lubricating oil as disclosed herein, wherein contacting the feed with the at least one solvent is in the ratio range of 1:1 to 1:4.

In an embodiment of the present disclosure, there is provided a method for dewaxing the lubricating oil as disclosed herein, wherein contacting the feed with the at least one solvent is in the ratio range of 1:1.5 to 1:3.5. In another embodiment of the present disclosure, there is provided a method for dewaxing the lubricating oil as disclosed herein, wherein contacting the feed with the at least one solvent is in the ratio range of 1:2 to 1:3.2. In yet another embodiment of the present disclosure, there is provided a method for dewaxing the lubricating oil as disclosed herein, wherein contacting the feed with the at least one solvent is in the ratio of 1:3.

In an embodiment of the present disclosure, there is provided a method for dewaxing the lubricating oil as disclosed herein, wherein processing the blend is facilitated by processes selected from the group consisting of heating, cooling, filtering, and combinations thereof.

In an embodiment of the present disclosure, there is provided a method for dewaxing the lubricating oil, the method comprising: a) obtaining a feed and at least one solvent; b) contacting the feed, the at least one solvent and the polymer for dewaxing to obtain a blend; c) processing the blend facilitated by processes selected from the group consisting of heating, cooling, filtering, and combinations thereof to obtain wax and dewaxed oil; wherein the polymer is in the weight percentage in the range of 0.08-0.12% with respect to the feed.

In an embodiment of the present disclosure, there is provided a method for dewaxing the lubricating oil as disclosed herein, wherein heating is carried out at a temperature in the range of 60 to 90° C. for a time period in a range of 20 to 30 minutes; wherein cooling is carried out at a temperature in the range of −10° C. to −40° C.; and wherein filtering is done at a pressure in the range of 100-300 mmHg.

In an embodiment of the present disclosure, there is provided a method for dewaxing the lubricating oil as disclosed herein, wherein processing the blend is facilitated by processes selected from the group consisting of heating, cooling, filtering, and combinations thereof and wherein heating is carried out at a temperature in the range of 60 to 90° C. for a time period in a range of 20 to 30 minutes; wherein cooling is carried out at a temperature in the range of −10° C. to −40° C.; and wherein filtering is done at a pressure in the range of 100-300 mmHg.

In an embodiment of the present disclosure, there is provided a method for dewaxing the lubricating oil as disclosed herein, wherein yield of the dewaxed oil is in the range of 65-85% with respect to the feed.

In an embodiment of the present disclosure, there is provided a method for dewaxing the lubricating oil as disclosed herein, wherein pour point of the dewaxed oil is in the temperature range of 3° C. to −20° C.

In an embodiment of the present disclosure, there is provided a method for dewaxing the lubricating oil as disclosed herein, wherein the dewaxed oil is filtered at a time period in the range of 30-70 seconds/200 ml feed.

In an embodiment of the present disclosure, there is provided a method for dewaxing the lubricating oil, the method comprising: a) obtaining a feed selected from the group consisting of petroleum oil, lubricating oil, atmospheric residue, various cuts of vacuum distillation column, light vacuum gas oil, heavy vacuum gas oil, heavy residue oil and at least one solvent selected from a group consisting of methyl ethyl ketone, hexane, methyl isobutyl ketone, propane, petroleum naphtha, ethylene dichloride, methylene chloride, sulphur dioxide and combinations thereof; b) contacting the feed, the at least one solvent and the polymer for dewaxing to obtain a blend; c) processing the blend facilitated by processes selected from the group consisting of heating, cooling, filtering, and combinations thereof to obtain wax and dewaxed oil; wherein the polymer is in the weight percentage in the range of 0.08-0.12% with respect to the feed and wherein contacting the feed with the at least one solvent is in the ratio range of 1:1 to 1:4 and wherein yield of the dewaxed oil is in the range of 65-85% with respect to the feed and wherein pour point of the dewaxed oil is in the temperature range of 3° C. to −20° C.

In an embodiment of the present disclosure, there is provided a method for dewaxing the lubricating oil, the method comprising: a) obtaining a feed selected from the group consisting of petroleum oil, lubricating oil, atmospheric residue, various cuts of vacuum distillation column, light vacuum gas oil, heavy vacuum gas oil, heavy residue oil and at least one solvent selected from a group consisting of methyl ethyl ketone, hexane, methyl isobutyl ketone, propane, petroleum naphtha, ethylene dichloride, methylene chloride, sulphur dioxide and combinations thereof; b) contacting the feed, the at least one solvent and the polymer having a number average molecular weight in the range of 5000-15000 derived from (i) 70-77 weight percentage of at least one alkyl acrylate; (ii) 23-28 weight percentage of at least one vinyl aromatic hydrocarbon; (iii) 0.1-2.5 weight percentage of at least one crosslinker; and (iv) 0.75-2.5 weight percentage of at least one initiator, for dewaxing to obtain a blend; c) processing the blend facilitated by processes selected from the group consisting of heating, cooling, filtering, and combinations thereof to obtain wax and dewaxed oil; wherein the polymer is in the weight percentage in the range of 0.08-0.12% with respect to the feed and wherein contacting the feed with the at least one solvent is in the ratio range of 1:1 to 1:4 and wherein yield of the dewaxed oil is in the range of 65-85% with respect to the feed and wherein pour point of the dewaxed oil is in the temperature range of 3° C. to −20° C.

Although the subject matter has been described in considerable detail with reference to certain preferred embodiments thereof, other embodiments are possible.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

With an aim to obtain an aid for the dewaxing process, the present disclosure attempted in obtaining a crosslinked polymer. The crosslinked polymer was derived from alkyl acrylate, vinyl aromatic hydrocarbon, crosslinker and an initiator. The weight percentages of these components were suitably chosen to prepare the crosslinked polymer. The preparation of the crosslinked polymer is a sequential preparation process and any change in the sequence would not result in a desired crosslinked polymer. Accordingly, the preparation process was identified and is explained herein.

Example 1

Crosslinked Polymer of the Present Disclosure for Dewaxing:

The crosslinked polymer of the present disclosure was derived from (a) 70-77 weight percentage of at least one alkyl acrylate; (b) 23-28 weight percentage of at least one vinyl aromatic hydrocarbon; (c) 0.1-2.5 weight percentage of at least one crosslinker; and (d) 0.75-2.5 weight percentage of at least one initiator and the polymer has a number average molecular weight in the range of 5000-15000. The usage of cross-linker in the process of preparation of the cross-linked polymer is critical to the invention.

Polymer 1 (Comparative Example):

Polymer 1 was prepared by the process as explained below. Octadecyl acrylate (49.02 wt %) was taken in a three necked RB flask and then, benzoyl peroxide (0.98 wt %) in xylenes solution was injected to obtain the first mixture. The flask was dipped into an oil bath which was at 100° C. and the first mixture was stirred mechanically for 3 hours to obtain a second mixture. To the second mixture, octadecyl acrylate (24.51 wt %), styrene 24.51 wt %) and benzoyl peroxide (0.98 wt %) in xylene was injected and stirring continued for another 3 hours at 100° C. to obtain the third mixture. The polymerization was terminated by the drop wise addition of 0.5 mL of methanol and exposed to the air to obtain the polymer 1. The polymer obtained was used for the dewaxing process. The characteristic analysis of the polymer 1 is provided herein. $^1$H-NMR (500 MHz, CHLOROFORM-D) δ 7.38-7.09 (Aromatic hydrogen's), 4.20-3.72 (m, 2H), 2.65 (q, J=7.6 Hz, 1H), 2.45-2.11 (m, 3H), 1.70-1.53 (m, 3H), 1.39-1.14 (m, 30H), 1.03-0.71 (m, 3H); IR data (cm$^{-1}$): 672.5, 721.0, 810.4, 983.9, 1083.8, 1184.3, 1270.9, 1295.0, 1407.9, 1467.3, 1727.1, 2849.0, 2915.9, 2955.9; Molecular weight (GPC): 8500

Crosslinked Polymer 2:

The process for preparing the crosslinked polymer 2 of the present disclosure is described below. Octadecyl acrylate (48.78 wt %), cyclopentadiene (0.24 wt %) were taken in a three necked RB and then, benzoyl peroxide (0.98 wt %) in xylenes solution was injected to obtain a first mixture. The flask containing the first mixture was dipped into an oil bath heated at a temperature of 100° C. and allowed to mechanical stirring for 3 hours to obtain a second mixture. To the second mixture, octadecyl acrylate (24.39 wt %), styrene (24.39 wt %), cyclopentadiene (0.24 wt %) and benzoyl peroxide (0.98 wt %) in xylenes solution was injected to obtain third mixture. Third mixture was heated at 100° C. under continued stirring for 3 hours. Then, the polymerization was terminated by the drop wise addition of 0.5 mL of methanol and exposed to the air to obtain crosslinked polymer. This crosslinked polymer 2 was used as such for the dewaxing process. The characteristic analysis of the crosslinked polymer 2 is provided herein. $^1$H-NMR (500 MHz, CHLOROFORM-D) δ 7.36-7.07 (Aromatic hydrogen's), 4.18-3.76 (m, 2H), 2.65 (q, J=7.6 Hz, 1H), 2.42-2.11 (m, 3H), 1.70-1.51 (m, 3H), 1.35-1.17 (m, 30H), 1.04-0.73 (m, 3H); IR data (cm$^{-1}$): 695.2, 751.5, 793.1, 1161.2, 1265.2, 1455.1, 1455.7, 1468.4, 1514.7, 1732.1, 2849.3, 2921.4; Molecular weight (GPC): 13500.

Crosslinked Polymer 3:

The process for preparing the crosslinked polymer 3 of the present disclosure is described below. Octadecyl acrylate (48.78 wt %), diallyl ether (0.24 wt %) were taken in a three necked RB and then, benzoyl peroxide (0.98 wt %) in xylene was injected to obtain a first mixture. The flask containing the first mixture was dipped into an oil bath heated at a temperature of 100° C. and allowed to mechanical stirring for 3 hours to obtain a second mixture. To the second mixture, octadecyl acrylate (24.39 wt %), styrene (24.39 wt %), diallyl ether (0.24 wt %) and benzoyl peroxide (0.98 wt %) in xylenes solution was injected to obtain a third mixture. Third mixture was heated at 100° C. under continued stirring for 3 hours. Then, this process of polymerization was terminated by the drop wise addition of 0.5 mL of methanol and exposed to the air to obtain a crosslinked polymer 3. This crosslinked polymer 3 was used as such for the dewaxing process. The characteristic analysis of the crosslinked polymer 3 is provided herein. $^1$H-NMR (500 MHz, CHLOROFORM-D) δ 7.36-7.07 (Aromatic hydrogen's), 4.18-3.76 (m, 2H), 2.65 (q, J=7.6 Hz, 1H), 2.42-2.11 (m, 3H), 1.70-

1.51 (m, 3H), 1.35-1.17 (m, 30H), 1.04-0.73 (m, 3H); IR data (cm$^{-1}$): 695.2, 751.5, 793.1, 1161.2, 1265.2, 1455.1, 1455.7, 1468.4, 1514.7, 1732.1, 2849.3, 2921.4; Molecular weight (GPC): 14500.

Crosslinked Polymers 4 and 5:

Crosslinked Polymer 4: The process for preparing the crosslinked polymer 4 is described below. Octadecyl acrylate (44.6 wt %), cyclopentadiene (4.5 wt %) were taken in a three necked RB and then, benzoyl peroxide (0.9 wt %) in xylenes solution was injected to obtain a first mixture. The flask containing the first mixture was dipped into an oil bath heated at a temperature of 100° C. and allowed to mechanical stirring for 3 hours to obtain a second mixture. To the second mixture, octadecyl acrylate (22.3 wt %), styrene (22.3 wt %), cyclopentadiene (4.5 wt %) and benzoyl peroxide (0.9 wt %) in xylenes solution was injected to obtain a third mixture. Third mixture was heated at 100° C. under continued stirring for 3 hours. Then, the polymerization was terminated by the drop wise addition of 0.5 mL of methanol and exposed to the air to obtain crosslinked polymer 4. Polymer 4 was found to insoluble in xylene. IR data (cm$^{-1}$) of crosslinked polymer 4: 695.2, 751.5, 793.1, 1161.2, 1265.2, 1455.1, 1455.7, 1468.4, 1514.7, 1732.1, 2849.3, 2921.4.

Crosslinked Polymer 5: The process for preparing the crosslinked polymer 5 is described below. Octadecyl acrylate (44.6 wt %), diallyl ether (4.5 wt %) were taken in a three necked RB and then, benzoyl peroxide (0.9 wt %) in xylenes solution was injected to obtain a first mixture. The flask containing the first mixture was dipped into an oil bath heated at a temperature of 100° C. and allowed to mechanical stirring for 3 hours to obtain a second mixture. To the second mixture, octadecyl acrylate (22.3 wt %), styrene (22.3 wt %), diallyl ether (4.5 wt %) and benzoyl peroxide (0.9 wt %) in xylenes solution was injected to obtain a third mixture. Third mixture was heated at 100° C. under continued stirring for 3 hours. Then, the polymerization was terminated by the drop wise addition of 0.5 mL of methanol and exposed to the air to obtain crosslinked polymer 5. Polymer 5 was found to insoluble in xylene. IR data (cm$^{-1}$) of crosslinked polymer 5: 697.4, 721.3, 729.1, 793.2, 934.1, 963.8, 1022.5, 1050.6, 1123.8, 1161.2, 1328.4, 1382.4, 1463.7, 1474.1, 1515.3, 1727.6, 2849.6, 2915.7, 3272.2.

The crosslinked polymers 4 and 5 were considered as non-working examples. It can be observed that, the weight percentages of the alkyl acrylate, crosslinker and the vinyl aromatic hydrocarbon fell outside the ranges as disclosed herein. And these polymers were insoluble in xylene mass and hence cannot be used for the dewaxing process. Thus, this indicated that all the components should be within the ranges disclosed herein for obtaining crosslinked polymer of the present disclosure. Any deviation in the weight percentages would not result in the desired crosslinked polymer for the dewaxing process.

Polymer 6 (Comparative Example):

The preparation process of polymer 6 is explained herein. Octadecyl acrylate (75 wt %), styrene (25 wt %) and benzoyl peroxide (2 wt %) in xylenes solution was mixed and stirred continuously for 3 hours at 100° C. Then, the polymerization was terminated by the drop wise addition of 0.5 mL of methanol and exposed to the air. The polymer 6 obtained was used for the dewaxing process.

Example 2

Method for Dewaxing the Lubricating Oil:

The method for dewaxing the lubricating oil of the present disclosure comprised the following steps. A feed selected from the group consisting of petroleum oil, lubricating oil, atmospheric residue, various cuts of vacuum distillation column, light vacuum gas oil, heavy vacuum gas oil, heavy residue oil was mixed with at least one solvent selected from methyl ethyl ketone, hexane, methyl isobutyl ketone, propane, petroleum naphtha, ethylene dichloride, methylene chloride, sulphur dioxide and combinations thereof along with the polymers from Example 1 to obtain a blend. The polymer was added in the weight percentage in the range of 0.08-0.12% with respect to the feed and whereas the feed to solvent were taken in the ratio range of 1:1 to 1:4. The blend was then subjected to processing to obtain wax and dewaxed oil.

In an actual dewaxing process, in 1 liter beaker, 375 mL of methyl ethyl ketone (MEK)/Hexane (1:1) solution and 0.1 wt % of the polymer 1 and 125 ml of feed was added to obtain a blend. The blend was stirred thoroughly and was heated to form a homogeneous solution. Further, the solution was cooled gradually to −30° C. at a rate of 2 to 3° C./min and was filtered at 200 mm Hg abs. pressure through a filtration assembly consisting of a filter stick with plant filter cloth, a graduated cylinder and vacuum balancing device to obtain a residue and filtrate. The time taken for various volumes of filtrate were recorded. After filtration, the residue was washed with 125 mL of MEK/Hexane (1:1) solution at −30° C. The residue wash and the filtrate with wash was collected and finally the solvent was stripped from the residue wash and the filtrate wash to obtain the dewaxed oil. The dewaxed oil was further tested, and the results obtained are recorded in Table 1.

TABLE 1

| Polymer | Feed | Dewaxed oil layer (ml) | Time required for dewaxed oil separation (seconds) | Yield of Dewaxed oil (%) | Pour point (° C.) | Viscosity Index |
|---|---|---|---|---|---|---|
| Polymer 1 | 500N feed | Not observed | 290 | 69 | −8 | 106 |
| Crosslinked polymer 2 | 500N feed | 150 | 65 | 71 | −10 | 105 |
| Crosslinked polymer 3 | 500N feed | 120 | 44 | 70 | −9 | 104 |
| Polymer 6 | 500N feed | Not observed | 380 | 74 | 10 | 118 |

From Table 1, the crosslinked polymers 2 and 3 resulted in an efficient dewaxing process. The wax layer got separated and the separation of dewaxed oil from the feed was found to be faster i.e., 65 and 44 seconds for crosslinked polymers 2 and 3 respectively. Further, the yield of the dewaxed oil was higher of about 70-71% with respect to the feed. The pour points of the dewaxed oil were −10° C. and −9° C. for crosslinked polymers 2 and 3 respectively and were found to be competitive. Thus, the crosslinked polymers 2 and 3 are considered working examples of the present disclosure, which could efficiently aid the dewaxing process. The crosslinked polymers 2 and 3 had all components within the disclosed range and were prepared by the process exemplified in the present disclosure.

However, from Table 1 it can be observed that the dewaxing process using polymers 1 and 6 did not result in separation of dewaxed oil (oil layer) and wax and moreover the time required for oil separation was higher, 290 and 380 seconds respectively. Thus, polymers 1 and 6 did not end up in the desired dewaxing process.

The polymer 1 is not cross-linked as it did not contain any crosslinker, hence the polymer when used in the dewaxing process was unable to efficiently dewax the feed. The crosslinker in the polymer is vital as it increases the nucleation rate in the wax crystal formation, thereby enhancing the process of separation of wax. And the absence of such crosslinkers in the polymer ended in undesired results with no or little wax separation and a higher time for oil separation.

Further from Table 1, it can be seen that polymer 6 also did not result in dewaxed oil. The process of preparing the crosslinked polymer of the present disclosure involved the processes of obtaining first, second and third mixtures and then the polymer and is a two-step polymerization process. But the polymer 6 was prepared in a single step and did not involve the preparation of first, second and third mixtures as disclosed in the present disclosure. Thus, the polymer 6 was prepared by a process deviated from the process as disclosed herein. And, this clearly indicated that any deviation in the process of preparing the crosslinked polymer will not yield desired dewaxing process.

From the examples defined above, it can be clearly substantiated that the crosslinked polymer for dewaxing, should have components and its weight percentages in the ranges as disclosed herein and prepared by the process as disclosed herein. Any deviation in the components, weight percentages, or the preparation process, results in undesired crosslinked polymer or incompetent dewaxing process.

Advantages of the Present Disclosure

The present disclosure provides a crosslinked polymer for dewaxing process derived from (a) 70-77 weight percentage of at least one alkyl acrylate; (b) 23-28 weight percentage of at least one vinyl aromatic hydrocarbon; (c) 0.1-2.5 weight percentage of at least one crosslinker; and (d) 0.75-2.5 weight percentage of at least one initiator. The crosslinked polymer of the present disclosure has a number average molecular weight in the range of 5000-15000. The present disclosure also provides a process for preparing the polymer, the process comprising: (a) dissolving at least one alkyl acrylate, at least one crosslinker and at least one initiator in at least one solvent to obtain a first mixture; (b) heating the first mixture to obtain a second mixture; (c) adding at least one alkyl acrylate, at least one vinyl aromatic hydrocarbon, at least one crosslinker, at least one initiator with the second mixture to obtain a third mixture; and (d) heating the third mixture to obtain the polymer. The present disclosure also provides for a method for dewaxing the feed using the crosslinked polymer of the present disclosure. The present disclosure results in the yield of the dewaxed oil in the range of 65-85% with respect to the feed. The present disclosure results in the dewaxed oil with pour point in the range of 3° C. to −20° C.

We claim:

1. A crosslinked polymer for dewaxing lubricating oils, the polymer consisting of:
(a) 70-77 weight percentage of at least one alkyl acrylate;
(b) 23-28 weight percentage of at least one vinyl aromatic hydrocarbon;
(c) 0.1-2.5 weight percentage of at least one crosslinker; and
(d) 0.75-2.5 weight percentage of at least one initiator,
wherein the polymer has a number average molecular weight in the range of 5000-15000 and wherein the crosslinker is selected from the group consisting of cyclopentadiene, diallyl ether, divinyl benzene, divinyl ether, and combinations thereof.

2. The polymer as claimed in claim 1, wherein the at least one alkyl acrylate is selected from the group consisting of octadecyl acrylate, decyl acrylate, dodecyl acrylate, ethylhexyl acrylate, behenyl acrylate, eicosyl acrylate, and combinations thereof; the at least one vinyl aromatic hydrocarbon is selected from the group consisting of styrene, vinyl naphthalene, vinyl anthracene, allyl benzene, methyl styrene, and combinations thereof; and the at least one initiator is selected from the group consisting of benzoylhydroperoxide, azobisisobutyronitrile, tertbutylhydroperoxide, methylethylketone peroxide, and combinations thereof.

3. A process for preparing the polymer as claimed in claim 1, the process comprising: (a) dissolving at least one alkyl acrylate, at least one crosslinker and at least one initiator in at least one solvent to obtain a first mixture; (b) heating the first mixture to obtain a second mixture; (c) adding at least one alkyl acrylate, at least one vinyl aromatic hydrocarbon, at least one crosslinker, at least one initiator with the second mixture to obtain a third mixture; and (d) heating the third mixture to obtain the polymer.

4. The process as claimed in claim 3, wherein the at least one solvent is selected from a group consisting of xylene, toluene, ethyl benzene, and combinations thereof.

5. The process as claimed in claim 3, wherein the at least one alkyl acrylate has a weight percentage in the range of 45-55% with respect to the first mixture; the at least one crosslinker has a weight percentage in the range of 0.1-1.0% with respect to the first mixture; and the at least one initiator has a weight percentage in the range of 0.7-1.2% with respect to the first mixture.

6. The process as claimed in claim 3, wherein heating the first mixture is done at a temperature in the range of 80-120° C. for a time period in the range of 2-4 hours.

7. The process as claimed in claim 3, wherein the at least one alkyl acrylate has a weight percentage in the range of 15-32% with respect to the second mixture; the at least one vinyl aromatic hydrocarbon has weight percentage in the range of 23-28% with respect to the second mixture; the at least one crosslinker has weight percentage in the range of 0.1-1.5% with respect to the second mixture; and the at least one initiator has weight percentage in the range of 0.8-1.3% with respect to the second mixture.

8. The process as claimed in claim 3, wherein heating the third mixture is carried out at a temperature in the range of 80-120° C. for a time period in the range of 2-4 hours.

9. The process as claimed in claim 3, wherein heating the third mixture is followed by termination with exposure to air to obtain the polymer.

10. A method for dewaxing lubricating oil, the method comprising:
(a) obtaining a feed and at least one solvent;
(b) contacting the feed, the at least one solvent and the polymer for dewaxing as claimed in claim 1 to obtain a blend;
(c) processing the blend to obtain wax and dewaxed oil;
wherein the polymer for dewaxing is in the weight percentage in the range of 0.08-0.12% with respect to the feed.

11. The method as claimed in claim 10, wherein the feed is selected from the group consisting of petroleum oil, lubricating oil, atmospheric residue, various cuts of vacuum distillation column, light vacuum gas oil, heavy vacuum gas oil, heavy residue oil, and wherein the at least one solvent is selected from a group consisting of methyl ethyl ketone, hexane, methyl isobutyl ketone, propane, petroleum naphtha, ethylene dichloride, methylene chloride, sulphur dioxide and combinations thereof.

12. The method as claimed in claim 10, wherein contacting the feed with the at least one solvent is in the ratio range of 1:1 to 1:4.

13. The method as claimed in claim 10, wherein processing the blend is facilitated by processes selected from the group consisting of heating, cooling, filtering, and combinations thereof.

14. The method as claimed in claim 13, wherein the heating is carried out at a temperature in the range of 60 to 90° C. for a time period in a range of 20 to 30 minutes; wherein the cooling is carried out at a temperature in the range of −10° C. to −40° C.; and wherein the filtering is done at a pressure in the range of 100-300 mmHg.

15. The method as claimed in claim 10, wherein dewaxed oil yield is in the range of 65-85% with respect to the feed.

16. The method as claimed in claim 10, wherein dewaxed oil pour point is in the temperature range of 3° C. to −20° C.

17. A process for preparing the polymer as claimed in claim 2, the process comprising: (a) dissolving at least one alkyl acrylate, at least one crosslinker and at least one initiator in at least one solvent to obtain a first mixture; (b) heating the first mixture to obtain a second mixture; (c) adding at least one alkyl acrylate, at least one vinyl aromatic hydrocarbon, at least one crosslinker, at least one initiator with the second mixture to obtain a third mixture; and (d) heating the third mixture to obtain the polymer.

18. A method for dewaxing lubricating oil, the method comprising:
    (a) obtaining a feed and at least one solvent;
    (b) contacting the feed, the at least one solvent and the polymer for dewaxing as claimed in claim 2 to obtain a blend;
    (c) processing the blend to obtain wax and dewaxed oil;
    wherein the polymer for dewaxing is in the weight percentage in the range of 0.08-0.12% with respect to the feed.

19. The method as claimed in claim 11, wherein dewaxed oil yield is in the range of 65-85% with respect to the feed.

20. The method as claimed in claim 11, wherein dewaxed oil pour point is in the temperature range of 3° C. to −20° C.

* * * * *